United States Patent
Hackett

(10) Patent No.: US 12,354,016 B2
(45) Date of Patent: Jul. 8, 2025

(54) PARALLEL INFERENCE PROCESSING BY DECISION TREE LEAF NODES

(71) Applicant: INTERNATIONAL BUSINESS MACHINES CORPORATION, Armonk, NY (US)

(72) Inventor: Charles E. Hackett, Greenlawn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 927 days.

(21) Appl. No.: 17/509,180

(22) Filed: Oct. 25, 2021

(65) Prior Publication Data
US 2023/0128776 A1 Apr. 27, 2023

(51) Int. Cl.
G06N 5/01 (2023.01)
G06N 20/00 (2019.01)
G06N 20/20 (2019.01)

(52) U.S. Cl.
CPC .............. G06N 5/01 (2023.01); G06N 20/00 (2019.01); G06N 20/20 (2019.01)

(58) Field of Classification Search
CPC ........... G06N 5/01; G06N 20/20; G06N 5/03; G06N 20/00
See application file for complete search history.

(56) References Cited

U.S. PATENT DOCUMENTS

| | | | |
|---|---|---|---|
| 7,921,392 B2 | 4/2011 | Furnish et al. | |
| 10,140,972 B2 | 11/2018 | Chen | |
| 10,943,271 B2 | 3/2021 | Miller et al. | |
| 11,169,288 B1* | 11/2021 | Johnson | G06N 20/10 |
| 2009/0089658 A1 | 4/2009 | Chiu et al. | |
| 2009/0254505 A1* | 10/2009 | Davis | G06N 5/04 706/46 |
| 2010/0036815 A1 | 2/2010 | Tago et al. | |
| 2019/0095507 A1 | 3/2019 | Elisseeff et al. | |
| 2022/0051104 A1 | 2/2022 | Interlandi et al. | |

(Continued)

OTHER PUBLICATIONS

Tracy, Tommy James II, "Accelerating Decision Tree Ensemble Inference with an Automata Representation", Aug. 31, 2019, EP093013349, Retrieved from the Internet at: https://libraetd.lib.virginia.edu/downloads/r207tp802? (140 pages) (Year: 2019).

(Continued)

*Primary Examiner* — Quoc A Tran
(74) *Attorney, Agent, or Firm* — Teddi Maranzano, Esq.; Kevin P. Radigan, Esq.; Heslin Rothenberg Farley & Mesiti P.C.

(57) ABSTRACT

Processing within a computing environment is facilitated by obtaining, by a decision tree inference accelerator, a decision node result vector based on processing an input data vector through decision nodes of a decision tree. Further, the processing is facilitated by accelerating, by the decision tree inference accelerator, leaf node processing of the decision node result vector. The decision tree inference accelerator facilitates, based on predetermined path vectors through the decision tree to each leaf node of the plurality of leaf nodes, processing of the decision node result vector by the plurality of leaf nodes in parallel, and determining therefrom which leaf node of the plurality of leaf nodes is selected.

20 Claims, 13 Drawing Sheets

(56) References Cited

U.S. PATENT DOCUMENTS

2023/0419190 A1\* 12/2023 Kim .................. G06N 20/20
2024/0220867 A1\* 7/2024 Nunes Coelho, Jr. ..................
                                                      G06N 3/042

OTHER PUBLICATIONS

International Search Report & Written Opinion for PCT/EO2022/078544, mailed Jan. 27, 2023 (11 pages) (Year: 2023).

Mel et al., "The NIST Definition of Cloud Computing," National Institute of Standards and Technology, Information Technology Laboratory, Special Publication 800-145, Sep. 2011 (pp. 1-7) (Year: 2011).

IBM Publication, "z/Architecture Principles of Operation," IBM® Publication No. SA22-7832-12, 13th Edition, Sep. 2019 (pp. Jan. 2000) (Year: 2019).

Anonymous, "Legal Precedent Mining with Machine Learning", ip.com, IPCOM000252097D, published Dec. 15, 2017 (37 pages) (Year: 2017).

Anonymous, "Branching Neural Netowrks", ip.com, IPCOM000254791D, published Aug. 2, 2018 (11 pages) (Year: 2018).

Anonymous, "System and Method to Predict Data Pattern and Lineage Given the System Output and Black-Box Model", ip.com, IPCOM000258727D, published Jun. 8, 2019 (5 pages) (Year: 2019).

Kasif, S. et al., "Prism: A Parallel Inference System for Problem Solving", Department of Computer Science, University of Maryland, College Park, MD (3 pages) (Year: 2015).

Kang, M. et al., "A 19.4 nJ/decision, 364K decisions/s, In-Memory Random Forest Multi-Class Inference Accelerator", IEEE, http://sscs.ieee.org/publications/ieee-journal-of-solid-state-circituis-jssc (11 pages) (Year: 2019).

Neiswanger, W. et al., "Asymptotically Exact, Embarrassingly Parallel MCMC", Machine Learning Department, Carnegie Mellon University, Mar. 24, 2014 (16 pages) (Year: 2014).

Tan, P. et al., "MML Inference of Oblique Decision Trees", School of Computer Science & Software Engineering, Monash University, AU (6 pages) (Year: 2004).

Wen, Z. et al., "Exploiting GPUs for Efficient Gradient Boosting Decision Tree Training", IEEE Transactions on Parallel and Distributed Systems, vol. 30, No. 12, published Dec. 1, 2019 (12 pages) (Year: 2019).

Zhang, D. et al., "Discovering Golden Nuggets: Data Mining in Financial Application" IEEE Transactions on Systems, Man and Cybernetics—Part C: Applications and Reviews, vol. 34, No. 4, Nov. 2004, pp. 513-522 (Year: 2004).

Hackett, Charles E., "Inflating Decision Tree to Facilitate Parallel Inference Processing", U.S. Appl. No. 17/509,187, filed Oct. 25, 2021 (64 pages).

Hackett, Charles E., "List of IBM Patents and Patent Applications Treated as Related", IBM Docket No.: P202101320US01, U.S. Appl. No. 17/509,180, filed Oct. 25, 2021, dated Oct. 27, 2021 (2 pages).

Owaida et al., "Scalable Inference of Decision Tree Ensembles: Flexible Design for CPU-FPGA Platforms", International Conference on Field-Programmable Logic and Applications, 2017, pp. 1-8, doi: 10.23919/FPL.2017.8056784.

Struharik R, "IP cores for hardware acceleration of decision tree ensemble classifiers", 2015 IEEE 19th International Conference on Intelligent Engineering Systems (INES), Sep. 3-5, 2015, pp. 45-50, doi: 10.1109/INES.2015.7329746.

Summers et al., "Fast inference of Boosted Decision Trees in FPGAs for particle physics", Computational Physics, https://arxiv.org/abs/2002.02534v2, Feb. 19, 2020, 14 pages.

\* cited by examiner

| Leaf | Path | M1 | M2 |
|---|---|---|---|
| L1 | 111.... | 0000000 | 1110000 |
| L2 | 110.... | 0010000 | 1110000 |
| L3 | 10.1... | 0100000 | 1101000 |
| L4 | 10.0... | 0101000 | 1101000 |
| L5 | 0...11. | 1000000 | 1000110 |
| L6 | 0...10. | 1000010 | 1000110 |
| L7 | 0...0.1 | 1000100 | 1000101 |
| L8 | 0...0.0 | 1000101 | 1000101 |

PATH
1 = TRUE
0 = FALSE
. = DON'T CARE

FIG. 4A

| $M1_i$ | $M2_i$ | $RV_i$ | $Y_i$ |
|---|---|---|---|
| 0 | 0 | 0 | 1 |
| 0 | 0 | 1 | 1 |
| 0 | 1 | 0 | 0 |
| 0 | 1 | 1 | 1 |
| 1 | 0 | 0 | -- |
| 1 | 0 | 1 | -- |
| 1 | 1 | 0 | 1 |
| 1 | 1 | 1 | 0 |

FIG. 4B

DECISION NODE RESULT VECTOR: 1010101

| Leaf | Path | M1 | M2 |
|---|---|---|---|
| L4 | 1 0 . 0 . . . | 0101000 | 1101000 |
| L7 | 0 . . . 0 . 1 | 1000100 | 1000101 |

L4

| | |
|---|---|
| DN = | 1010101 |
| M1 = | 0101000 |
| XOR = | 1111101 |
| M2 = | 1101000 |
| AND = | 1101000 |
| XOR = | 0000000 |
| NOT = | 1111111 and is selected |

L7

| | |
|---|---|
| DN | 1010101 |
| M1 = | 1000100 |
| XOR = | 0010001 |
| M2 = | 1000101 |
| AND = | 0000001 |
| XOR = | 1000100 |
| NOT = | 0111011 is not selected |

FIG. 6

OBTAIN, BY A DECISION TREE INFERENCE ACCELERATOR, A DECISION NODE RESULT VECTOR BASED ON PROCESSING AN INPUT DATA VECTOR THROUGH DECISION NODES OF A DECISION TREE ~700

ACCELERATE, BY THE DECISION TREE INFERENCE ACCELERATOR, LEAF NODE PROCESSING OF THE DECISION NODE RESULT VECTOR, THE DECISION TREE INFERENCE ACCELERATOR FACILITATING, BASED ON RESPECTIVE, PREDETERMINED PATH VECTORS THROUGH THE DECISION TREE FOR EACH LEAF NODE OF A PLURALITY OF LEAF NODES, PROCESSING OF THE DECISION NODE RESULT VECTOR BY THE PLURALITY OF LEAF NODES IN PARALLEL AND DETERMINING THEREFROM WHICH LEAF NODE OF THE PLURALITY OF LEAF NODES IS SELECTED ~702

WHERE THE FACILITATING INCLUDES

OBTAINING FOR EACH LEAF NODE ONE MASK AND ANOTHER MASK FROM THE RESPECTIVE, PREDETERMINED PATH VECTOR, WHERE EACH LEAF NODE HAS A RESPECTIVE ONE MASK AND A RESPECTIVE OTHER MASK ~704

APPLYING, FOR A LEAF NODE OF THE PLURALITY OF LEAF NODES, THE RESPECTIVE ONE MASK AND THE RESPECTIVE OTHER MASK TO THE DECISION NODE RESULT VECTOR TO DETERMINE WHETHER THE LEAF NODE IS SELECTED ~706

WHERE THE RESPECTIVE ONE MASK IDENTIFIES WHICH DECISION NODES IN THE RESPECTIVE, PREDETERMINED PATH VECTOR TOOK A FALSE BRANCH, AND THE RESPECTIVE OTHER MASK IDENTIFIES WHICH DECISION NODES IN THE RESPECTIVE, PREDETERMINED PATH VECTOR WERE USED, WHETHER TRUE OR FALSE, TO REACH THE LEAF NODE ~708

WHERE THE APPLYING INCLUDES:

APPLYING THE RESPECTIVE ONE MASK TO THE DECISION NODE RESULT VECTOR WITH EXCLUSIVE OR-LOGIC TO PRODUCE AN UPDATED RESULT VECTOR ~710

APPLYING THE OTHER RESPECTIVE MASK TO THE UPDATED RESULT VECTOR USING AND-LOGIC TO OBTAIN A FURTHER UPDATED RESULT VECTOR ~712

COMPARING THE RESPECTIVE OTHER MASK TO THE FURTHER UPDATED RESULT VECTOR USING EXCLUSIVE NOR-LOGIC TO DETERMINE WHETHER THE LEAF NODE IS SELECTED ~714

APPLYING REDUCTION-LOGIC TO A RESULT OF THE COMPARING, THE REDUCTION-LOGIC INCLUDING AND-LOGIC ~716

FIG. 7A

WHERE THE APPLYING INCLUDES:

APPLYING THE RESPECTIVE ONE MASK TO THE DECISION NODE RESULT VECTOR WITH EXCLUSIVE OR-LOGIC TO PRODUCE AN UPDATED RESULT VECTOR ~ 718

APPLYING THE RESPECTIVE OTHER MASK TO THE UPDATED RESULT VECTOR USING AND-LOGIC TO OBTAIN A FURTHER UPDATED RESULT VECTOR ~ 720

COMPARING THE RESPECTIVE OTHER MASK TO THE FURTHER UPDATED RESULT VECTOR USING EXCLUSIVE OR-LOGIC TO DETERMINE WHETHER THE LEAF NODE IS SELECTED ~ 722

APPLYING REDUCTION-LOGIC TO A RESULT OF THE COMPARING, THE REDUCTION-LOGIC INCLUDING NOR-LOGIC ~ 724

WHERE THE FACILITATING INCLUDES DETERMINING, FOR EACH LEAF NODE OF THE PLURALITY OF LEAF NODES, AT LEAST ONE RESPECTIVE MASK FROM THE RESPECTIVE, PREDETERMINED PATH VECTOR, THE RESPECTIVE MASKS FOR THE PLURALITY OF LEAF NODES FACILITATING PROCESSING OF THE DECISION NODE RESULT VECTOR BY THE PLURALITY OF LEAF NODES IN PARALLEL, AND DETERMINING THEREFROM WHICH LEAF NODE OF THE PLURALITY OF LEAF NODES IS SELECTED ~ 726

WHERE THE DECISION NODE RESULT VECTOR HAS A LENGTH IN BITS EQUAL TO A NUMBER OF DECISION NODES IN THE DECISION TREE, AND WHERE THE ACCELERATING INCLUDES PROVIDING EACH LEAF NODE OF THE PLURALITY OF LEAF NODES WITH THE DECISION NODE RESULT VECTOR, AND THE ACCELERATING INCLUDES PROCESSING BY EACH LEAF NODE OF THE PLURALITY OF LEAF NODES THE DECISION NODE RESULT VECTOR IN PARALLEL, AND DETERMINING THEREFROM WHICH LEAF NODE OF THE PLURALITY OF LEAF NODES IS SELECTED ~ 728

WHERE THE PROCESSING BY EACH LEAF NODE OF THE DECISION NODE RESULT VECTOR IS INDEPENDENT OF THE PROCESSING OF THE DECISION NODE RESULT VECTOR BY ANY OTHER LEAF NODE OF THE PLURALITY OF LEAF NODES OF THE DECISION TREE ~ 730

WHERE THE ACCELERATING FURTHER INCLUDES OUTPUTTING ONE OR MORE VALUES ASSOCIATED WITH A SELECTED LEAF NODE OF THE PLURALITY OF LEAF NODES AS OUTPUT RESULTS OF THE DECISION TREE, OR AN ENCODED RESULT OF THE DETERMINING WHICH LEAF NODE OF THE PLURALITY OF LEAF NODES IS SELECTED ~ 732

FIG. 7B

PARALLEL INFERENCE PROCESSING BY DECISION TREE LEAF NODES

BACKGROUND

Decision trees are one approach to machine learning, with decision tree adoption being widespread across many disciplines. Inference performance of a decision tree in a production environment can be a significant issue. Conventionally, decision tree inference processing is inherently sequential. Decision node comparisons are tested in hierarchical sequence as prescribed by the decision tree structure. Decision nodes branch to other decision nodes depending on the results of the comparisons, where the logic fetches the next node of the tree to process. These branches are skip sequential memory accesses, which can cause a pipeline slowdown in the central processing unit due to memory access delays. This memory access pattern is endemic to the decision tree structure. To assist performance, a decision tree inference workload can be offloaded to a peripheral computational device to reduce resource consumption on, for instance, one or more central processing units (CPUs).

SUMMARY

Certain shortcomings of the prior art are overcome and additional advantages are provided through the provision, in one or more aspects, of a system for facilitating processing within a computing environment. The system includes a memory, and a processing circuit in communication with the memory, and is configured to perform a method, which includes obtaining, by a decision tree inference accelerator, a decision node result vector based on processing an input data vector through decision nodes of a decision tree. Further, the method includes accelerating, by the decision tree inference accelerator, leaf node processing of the decision node result vector. The decision tree inference accelerator facilitates, based on respective, predetermined path vectors through the decision tree to each leaf node of a plurality of leaf nodes, processing of the decision node result vector by the plurality of leaf nodes in parallel and determining therefrom which leaf node of the plurality of leaf nodes is selected.

Advantageously, the decision tree inference accelerator enhances processing within the computing environment by, for instance, allowing central processing unit processing to be offloaded to the decision tree inference accelerator. Further, the decision tree inference accelerator is configured to facilitate full parallel processing by the plurality of leaf nodes of the decision node result vector based on respective, predetermined path vectors through the decision tree to each leaf node of the plurality of leaf nodes. In this manner, latency of decision tree inference processing is reduced, enhancing processing throughput of the decision tree and/or decision tree ensemble.

In one example, the facilitating includes obtaining for each leaf node one mask and another mask from the respective, predetermined path vector, where each leaf node has a respective one mask and a respective other mask, and applying, for a leaf node of the plurality of leaf nodes, the respective one mask and the respective other mask to the decision node result vector to determine whether the leaf node is selected.

In one example, the respective one mask identifies which decision nodes in the respective, predetermined path vector took a false branch, and the respective other mask identifies which decision nodes in the respective, predetermined path vector were used, whether true or false, to reach the leaf node. Using the two noted masks, parallel processing by the leaf nodes of the decision node result vector is enhanced.

In one embodiment, the applying includes applying the respective one mask to the decision node result vector with exclusive OR-logic to produce an updated result vector, and applying the respective other mask to the updated result vector using AND-logic to obtain a further updated result vector. Further, the applying includes comparing the respective other mask to the further updated result vector using exclusive NOR-logic to determine whether the leaf node is selected, and applying reduction-logic to a result of the comparing, where the reduction-logic includes AND-logic.

In another example, the applying includes applying the respective one mask to the decision node result vector with exclusive OR-logic to produce an updated result vector, and applying the respective other mask to the updated result vector using AND-logic to obtain a further updated result vector. Further, the applying includes comparing the respective other mask to the further updated result vector result using exclusive OR-logic to determine whether the leaf node is selected, and applying reduction logic to a result of the comparing, where the reduction logic includes NOR-logic.

In one example, the facilitating by the decision tree inference accelerator includes determining, for each leaf node of the plurality of leaf nodes, at least one respective mask from the respective, predetermined path vector. The respective masks of the plurality of leaf nodes are used to facilitate processing of the decision node result vector by the plurality of leaf nodes in parallel, and determining therefrom which leaf node of the plurality of leaf nodes is selected.

In one example, the decision node result vector has a length in bits equal to a number of decision nodes in the decision tree, and the accelerating includes providing each leaf node of the plurality of leaf nodes with the decision node result vector. The accelerating includes processing by each leaf node of the plurality of leaf nodes the decision node result vector in parallel, and determining therefrom which leaf node of the plurality of leaf nodes is selected.

In one example, the processing by each leaf node of the decision node result vector is independent of the processing of the decision node result vector by any other leaf node of the plurality of leaf nodes of the decision tree.

In one example, the accelerating further includes outputting one or more values associated with a selected leaf node of the plurality of leaf nodes as output results of the decision tree.

Computer-implemented methods and computer program products relating to one or more aspects are also described and claimed herein. Further, services relating to one or more aspects are also described and can be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 4A depicts one embodiment of leaf node masks derived from the predetermined leaf node path vectors, in accordance with one or more aspects of the present invention;

FIG. 4B depicts one embodiment of a data structure for accelerated inference by decision tree leaf nodes, in accordance with one or more aspects of the present invention;

FIG. 6 depicts examples of accelerated inferencing by decision tree leaf nodes, illustrating two leaf nodes, one being selected, and the other not selected, in accordance with one or more aspects of the present invention;

FIGS. 7A-7B depict one embodiment of a workflow illustrating certain aspects of one or more embodiments of the present invention;

FIG. 9B depicts one example of further details of a memory of

FIG. 9A, in accordance with one or more aspects of the present invention;

DETAILED DESCRIPTION

Figure 1:
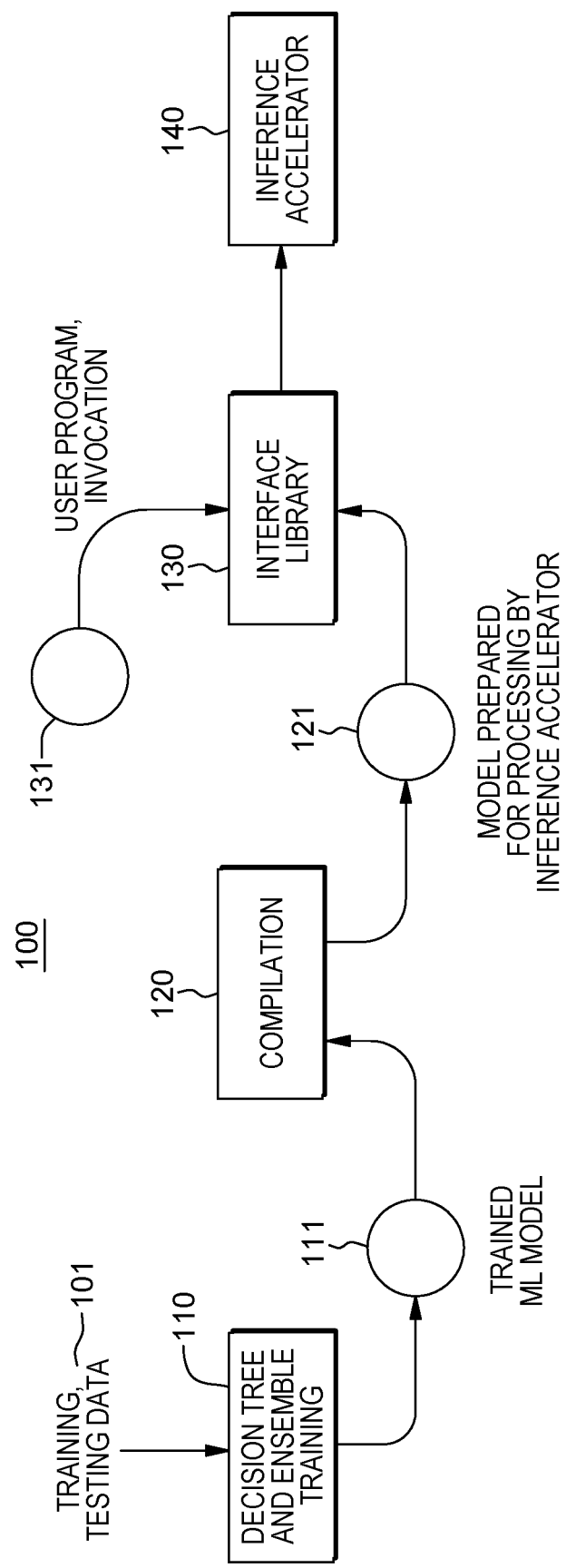
FIG. 1 depicts one embodiment of a computing environment process for accelerating inference of decision trees and decision tree ensembles, in accordance with one or more aspects of the present invention.

The accompanying figures, in which like reference numerals refer to identical or functionally similar elements throughout the separate views, and which are incorporated in and form a part of this specification, further illustrate the present invention and, together with the detailed description of the invention, serve to explain aspects of the present invention. Note in this regard that descriptions of well-known systems, devices, accelerators, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further, that numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, accelerators, protocols, layouts, schematics or tools, only as examples, and not by way of limitation. Further, the illustrative embodiments are described in certain instances using particular hardware, software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 8:
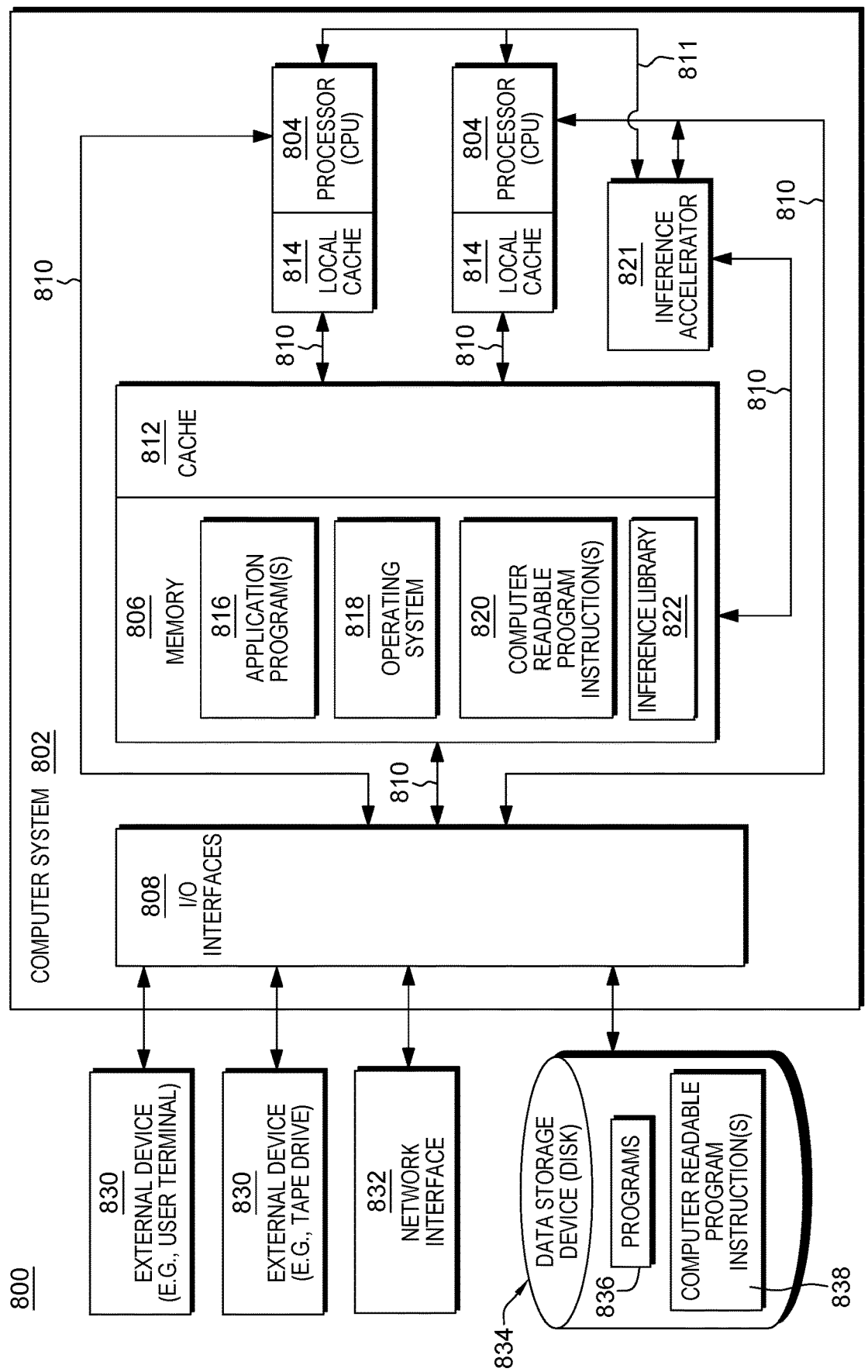
FIG. 8 depicts one example of a computing environment to incorporate and use one or more aspects of the present invention.

As understood by one skilled in the art, program code, as referred to in this application, can include both hardware and software. For example, program code in certain embodiments of the present invention can include fixed function hardware, but other embodiments can utilize a software-based implementation of the functionality described. Certain embodiments combine both types of program code. One example of program code, also referred to as one or more programs or program instructions, is depicted in FIG. 8 as one or more of application program(s) 816, computer-readable program instruction(s) 820, and/or interference library 822, stored in memory 806 of computer system 802, as well as programs 836 and computer-readable program instruction(s) 838, stored in a data storage device 834 accessed by computer system 802. In one or more other embodiments, the program code can be fixed function hardware implemented within one or more interference accelerators 821 of computer system 802.

As noted, decision tree inference processing is conventionally inherently sequential, with decision node comparisons typically being tested in hierarchical sequence, as prescribed by the decision tree structure. Decision nodes branch to other decision nodes depending on the results of the comparisons, where the logic fetches the next node to process. These branches are skip sequential memory accesses, which cause a pipeline slowdown in the CPU due to memory access delays. This memory access pattern is endemic to the decision tree structure.

In contrast, decision tree inference processing, via an inference accelerator such as disclosed herein, provides full parallelization with processing time measured in clock cycles, not milliseconds, as with other machine learning techniques. In one embodiment, section-wide parallelism of decision tree ensembles is disclosed with, for instance, all decision nodes being processed in parallel at once, and all leaf nodes being processed in parallel at once, as described herein. A parallel adder, or adder tree, can be used to summarize the parallel results. Further, as discussed herein, library support can be provided with the interface accelerator, and if demand exceeds accelerator supply of any internal resource, then the processing can be performed with multiple iterations. Further, in one embodiment, decision trees can be inflated to conform to a fully populated form, as needed, depending on the implementation. Decision tree ensembles can be translated into a format required by the inference accelerator, and the decision tree or decision tree ensemble can be separated into different processing sections, as needed. For instance, as noted, all decision nodes can be processed in parallel by the accelerator, followed by all leaf nodes in parallel.

In one embodiment, a decision tree ensemble can include multiple independent decision trees, with each tree being a weak learner. Decision tree results can be weighted, with, for instance, a signal or value from a good tree being amplified, and a signal or value from a bad tree being attenuated. By way of example, a random forest is a machine learning model based on decision tree ensembles.

FIG. 1 depicts one embodiment of a computing environment process 100, in accordance with one or more aspects of the present invention. By way of example, computing environment process 100 illustrates one embodiment of an overall process to facilitate accelerated decision tree inferencing such as disclosed herein, which in one embodiment, can be embedded in or reside in an inference tree inference accelerator 140. As illustrated, the inference accelerator is trained using training or testing data 101 to produce, in one embodiment, a trained machine learning model 111. The decision tree or decision tree ensemble training can develop the decision tree using, for instance, existing software processes, such as SKLearn (i.e., a machine learning library for the Python™ programming language) and be saved in the software-determined format. The trained machine learning model 111 is then compiled 120, which in one embodiment, is performed by a special-purpose compiler that converts or formats the decision tree or decision tree ensemble into a form usable by inference accelerator 140. For instance, in one implementation, a compilation process converts the SKLearn decision tree (or decision tree ensemble) into a format required by the inference accelerator. In addition, the compilation process can include, for instance, inflating pruned trees (as described herein) to fully-populated trees at a specified depth. Lists of decision nodes and leaf nodes are generated, in one or more embodiments, for transmission to the inference accelerator. The machine learning model 121 prepared for processing by inference accelerator 140 can, in one embodiment, be saved to an inference library 130 for invoking by a user program 131 to drive inference accelerator 140, sending, for instance, an input data vector and the trained decision tree(s) to the inference accelerator. In one embodiment, the library interface responds to a caller's request, performs data conversion for provision to inference accelerator 140, transmits the decision nodes and input data vector to the inference accelerator, and waits for the output results.

Figure 2A:
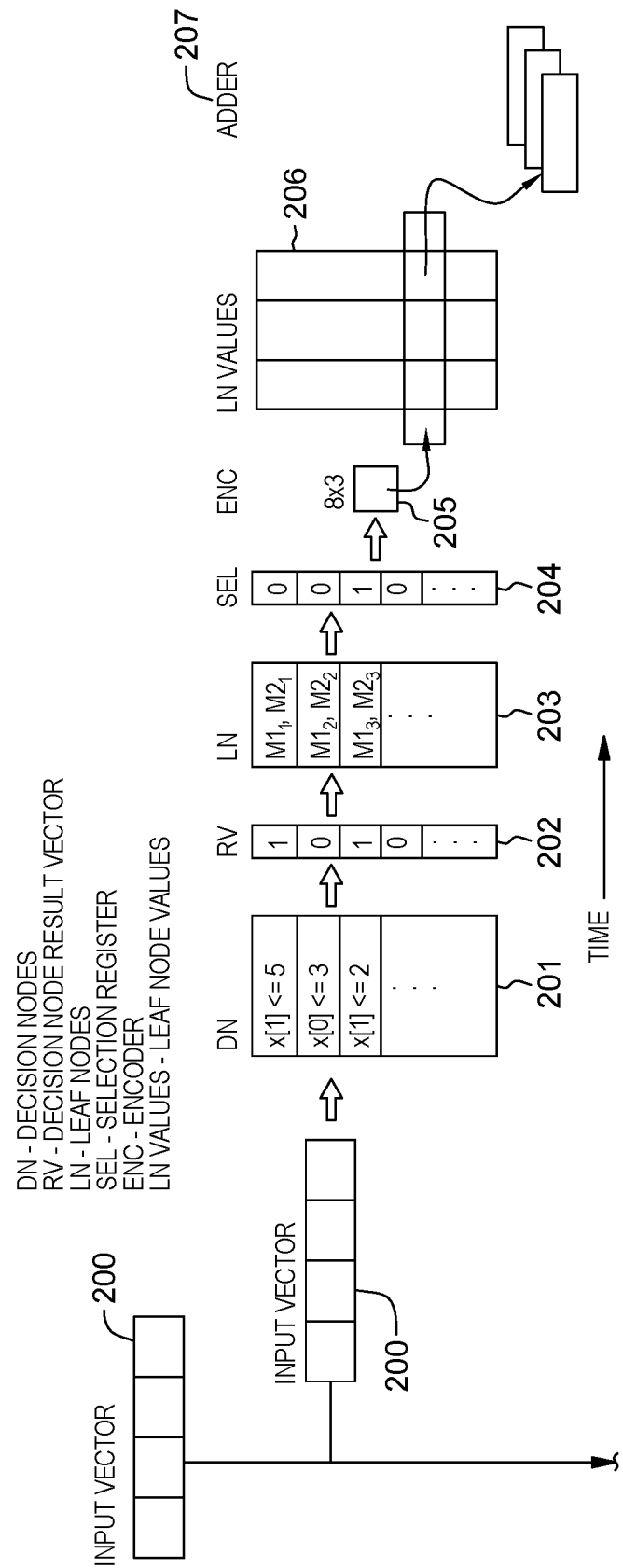
FIG. 2A depicts one embodiment of accelerated inference of a decision tree, in accordance with one or more aspects of the present invention.
Figure 2B:
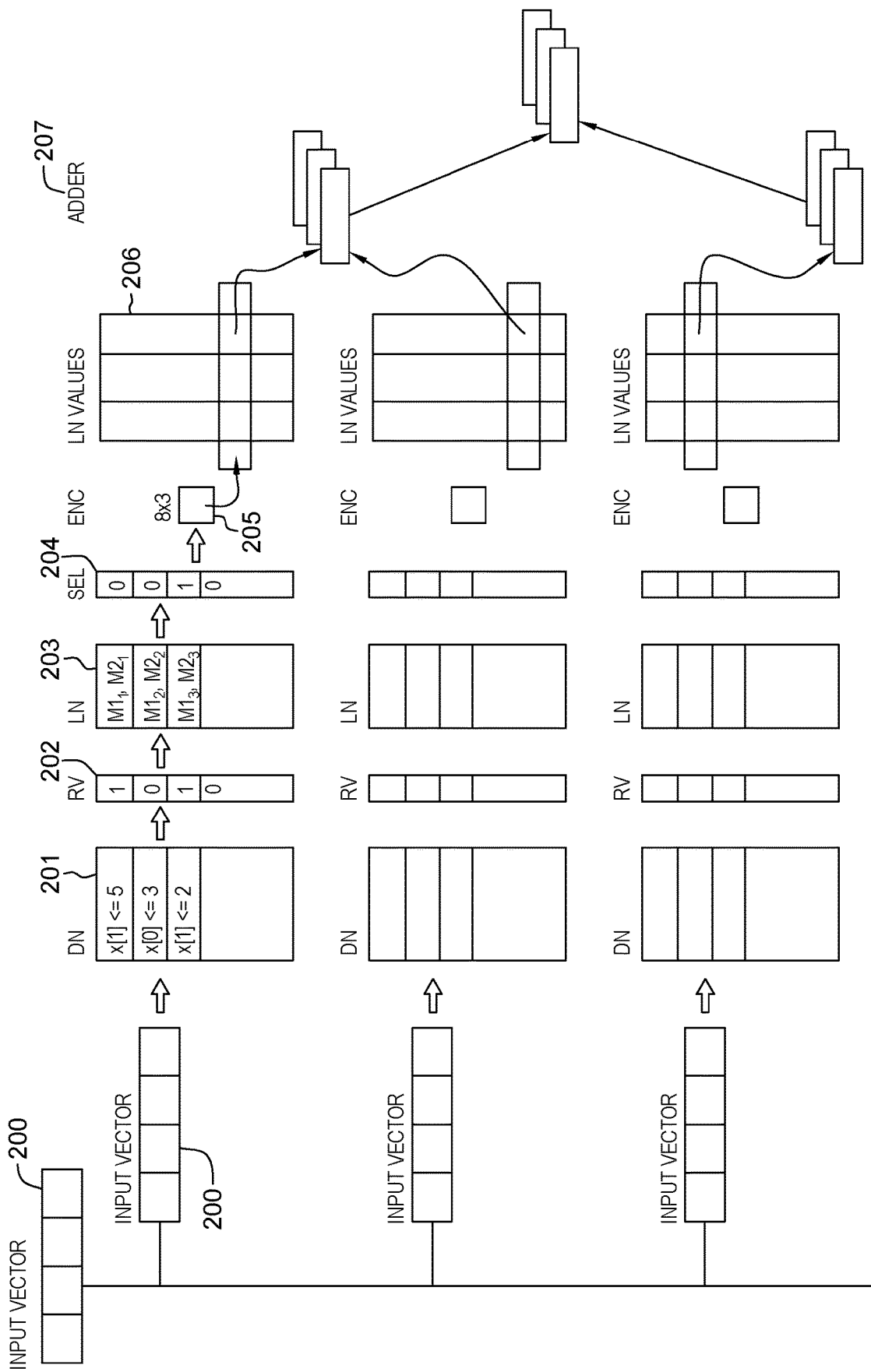
FIG. 2B depicts one embodiment of accelerated inference of a decision tree ensemble, in accordance with one or more aspects of the present invention.

The inference accelerator can be housed, in one or more embodiments, external from a central processing unit (CPU), and can be, in one or more embodiments, a multi-core inference engine, configured to read decision nodes, obtain data from the caller's memory, and perform processes on the decision tree (or decision tree ensemble) including, in one embodiment, processing the decision nodes in parallel or concurrently, and separately processing the leaf nodes in parallel, for instance, using a bit-level parallelism. Further, in one embodiment, an adder or adder tree can be provided to accumulate output values in parallel, with the output of the inference accelerator being returned to the caller (e.g., user program). In another embodiment, the encoded result of the leaf node selection process, representing an index of the selected leaf node, can be returned to the calling process for further processing. This would remove the need for an adder in the inference accelerator and would serve to reduce the amount of information needed to be transmitted to the inference accelerator. Thus, the embodiments depicted and described herein with reference to the inclusion of one or more adders or adder trees are one example only of an inference accelerator with enhanced decision tree leaf node processing such as described. FIGS. 2A & 2B depict timelines of concurrent processes implemented, in one or more embodiments, by an inference accelerator such as disclosed herein (with one or more output adders or adder trees being illustrated by way of example only).

Referring to FIG. 2A, a timeline of concurrent steps of one embodiment of the inference accelerator is illustrated, where an input data vector 200 is provided to the decision nodes 201 of a decision tree for processing, such as in parallel, to produce a decision node result vector 202, which is provided as input to leaf node processing that uses (in one embodiment) multiple masks (e.g., $M1_i$, $M2_i$), such as described herein. The parallel processing by the leaf nodes using the mask(s) produces data that is provided to, for instance, a selection register 204, with the selection register being fed to an encoder 205 to obtain an index into the selected leaf node values 206, with the applicable leaf node value being the output result fed (in one embodiment) to an adder 207. Alternatively, as noted, the index of the selected leaf node value 206 can be the output result.

By way of further example, FIG. 2B depicts the timeline of concurrent steps illustrated in FIG. 2A, expanded for a decision tree ensemble, with multiple decision trees being processed in parallel, and with an adder tree 207 being expanded to sum the leaf node values output (in one embodiment).

In one or more implementations, a decision tree includes a hierarchy of decision nodes, with a leaf node residing at the terminus of each path through the decision tree. Each decision node can have a comparison of a variable against a constant value, which results in a Boolean value, either true or false. The decision node includes two edges that represent the paths to the next nodes in the tree, which can either be another decision node or a leaf node. A leaf node is reached depending on the results of the decision nodes test, and once reached, is said to be selected. Each leaf node has one or more values associated with it that, once selected, are output as the result of the decision tree.

Disclosed herein is an inference accelerator that uses the path through the decision tree for each leaf node of the plurality of leaf nodes of the decision tree to infer whether the leaf node is selected. In one embodiment, all decision node comparisons of the decision tree are first determined to obtain by the inference accelerator a decision node result vector. In one example, the decision nodes can be processed in parallel, though that is not required.

In one or more embodiments, the inference accelerator utilizes two masks for each leaf node derived from the leaf node's path. These masks are used to determine whether the leaf node is the one leaf node selected among the set of leaf nodes of the decision tree. Only one leaf node is selected for the decision tree for any given vector of input data using inference processing. In this manner, the entire set of leaf nodes of the decision tree can be processed in parallel by the inference accelerator. Advantageously, this approach reduces latency of the decision tree inference and provides a rapid turnaround of results of the decision tree, or decision tree ensemble, which leads to higher processing throughput.

Figure 3A:
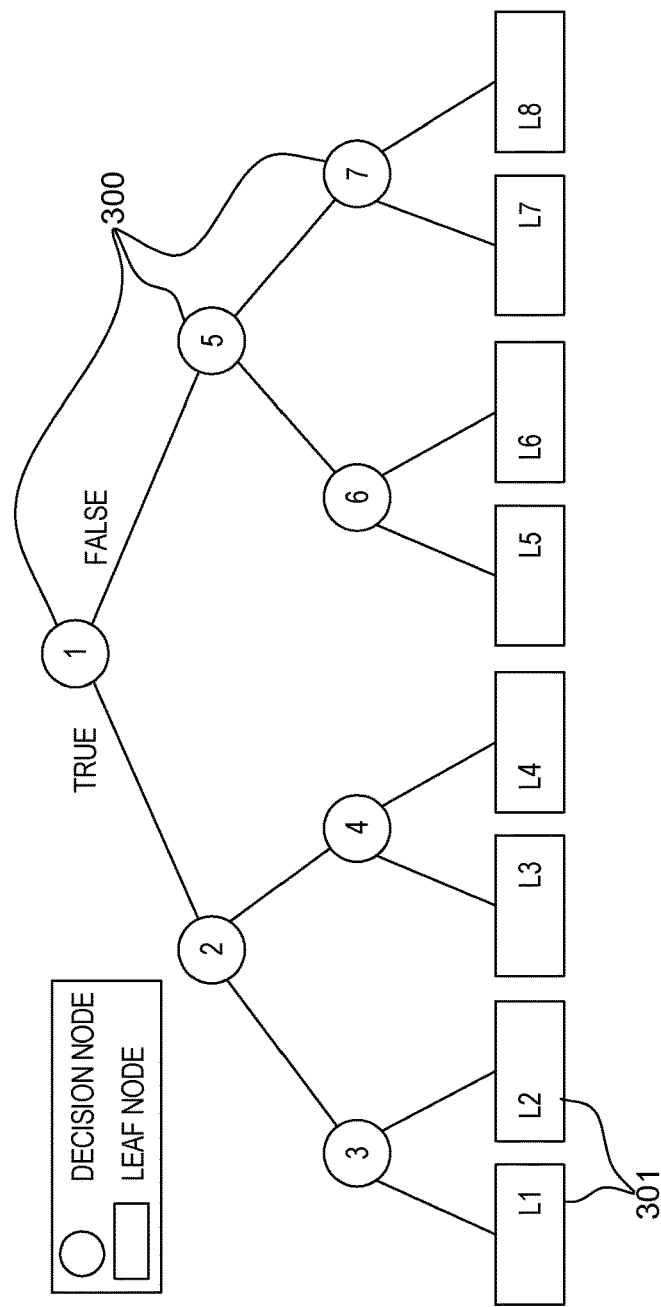
FIG. 3A depicts one embodiment of a decision tree for which leaf node path vectors are to be determined, in accordance with one or more aspects of the present invention.

As illustrated in the decision tree example of FIG. 3A, decision trees include two types of nodes, decision nodes 300, and leaf nodes 301. Decision nodes 300 each perform a comparison that determines which branch to take (true or false). Decision nodes 300 are arrayed in a hierarchal structure, and are selected (except for the root decision node) depending on higher-node(s) decision(s). Leaf nodes 301 are present at the terminus of paths through the tree. The path followed through the tree is distinct for the input data vector during the inference process, and the results of the test of the decision nodes determine that path. Once a leaf node has been reached, the selected leaf node informs what values to return from the decision tree processing.

The depth of a leaf node 301 is the distance from the root decision node to the leaf node. FIG. 3A illustrates an example decision tree of depth=3, with decision nodes numbered in a depth-first order, as are the leaf nodes (in one example). The leaf nodes are indicated by a prefix of "L" in FIG. 3A. Branches associated with a comparison result of true are assumed to go to the left, with false branches to the right.

The decision nodes 300 are ordered in a depth-first sequence, which is a common technique for ordering decision nodes of a decision tree. The leaf nodes are also ordered in the depth-first manner, though they can also be seen to be left-to-right ordered.

A fully-populated decision tree has all of its leaf nodes 301 at the same distance from the root decision node. The inference accelerator disclosed herein does not require that the decision tree be in fully-populated form, and only for illustrative purposes is FIG. 3A shown fully-populated.

The leaf node distance is the number of edges between the root decision node and the leaf node, and is referred to as the depth. For a given depth of a fully-populated tree, there are two raised to the power of the depth leaf nodes, and one less decision node. For example, a fully-populated tree of depth=3, will have $2^3$, or 8 leaf nodes, and 7 decision nodes.

As noted, the decision tree has been trained, and is used in the inference accelerator, such as disclosed. In one embodiment, the trained decision tree is passed through a compilation process, which extracts and/or formats the information needed by the inference accelerator.

Figure 3B:
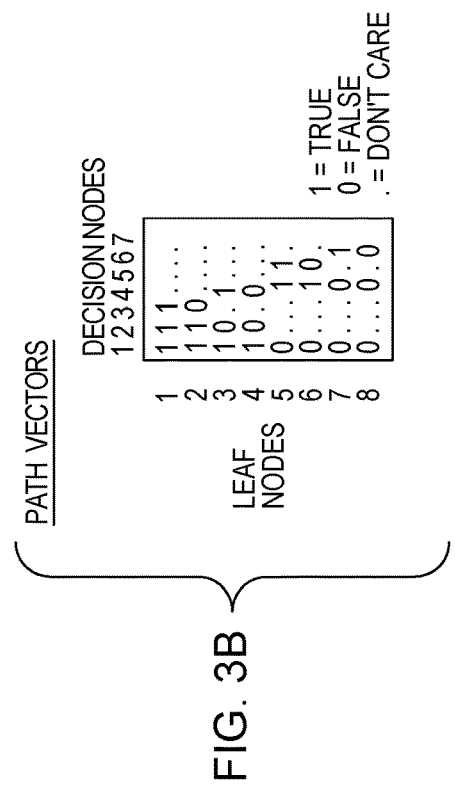
FIG. 3B depicts one embodiment of predetermined leaf node path vectors for the decision tree embodiment of FIG. 3A, in accordance with one or more aspects of the present invention.

In one or more implementations, the path of each leaf node in the decision tree is identified through the decision nodes, and two masks are derived for each leaf node from the respective path. FIG. 3B depicts the path to each leaf node 301 through the set of decision nodes of the example of FIG. 3A. Each leaf node indicates whether the decision node was true (1) or false (0). If a decision node is not part of a leaf node's path, then it is indicated by a ".", as illustrated in FIG. 3B.

The two masks (referred to herein as masks Ml, M2) can be derived from the path vectors, such as the vectors illustrated in FIG. 3B. As explained further below, the two masks are used by the accelerator to provide the parallel opportunity for analyzing the leaf nodes. One of these masks (M1) is provided to identify which decision nodes in the path vector took a false branch, and are denoted by "1" in the relevant position, with all other positions being "0". The other mask (M2) identifies which decision nodes in the path were used, either true or false, showing a "1" where the decision node position is, and all others being "0". FIG. 4A illustrates an example of the one mask M1 and the other mask M2, obtained or derived from the respective path vectors of each leaf node, using the example of FIG. 3B.

When processing a decision tree, each decision node sets a Boolean indicator of whether the comparison result is true or false. The aggregate of the decision node indicators of the decision tree are a decision node result vector (RV) in FIGS. 2A & 2B. The decision node result vector length in bits is equal to the number of decision nodes in the tree, one bit per decision node, and follows the order of the decision nodes.

In one solution to decision tree processing, it is possible to use the full set of combinations of decision node outcomes to reach each leaf node, and store this in an internal table. However, the number of combinations explodes because there are two raised to the number of decision node power possible combinations. For a depth-3 decision tree, there are seven decision nodes, and hence $2^7$, or 128 combinations. For a 4-depth tree, $2^{15}$, or 32K combinations, for a depth-5 tree, $2^{31}$, or 2G combinations. In comparison, using the predetermined path vector technique described herein, for a depth-3 decision tree, there are 8 leaf nodes, with each having 3 decision nodes in its path. For a depth-4 tree, there are 16 leaf nodes, with each having 4 decision nodes in its path, and for a depth-5 tree, there are 32 leaf nodes, with each having 5 decision nodes in its path.

In one or more embodiments of the parallel inference processing disclosed herein, each leaf node processing is provided its own copy of the decision node result vector from the set of decision node processes. In one implementation, the one mask M1 is applied to the decision node result vector with a bit-wise exclusive OR (XOR), and the other mask M2 is applied to the updated result vector with a bit-wise logical AND (AND). The result of this operation is then compared to the other mask M2 using a not-exclusive-OR (XNOR). A reduction AND can then be applied to all the bits of the result vector to obtain a single result. This single result is (in one embodiment) a single indicator that signals whether this leaf node is selected or not. If all the bits in the leaf node inference result vector are a binary 1, then the combination will be true, and the leaf node is selected, otherwise, the result is false, and the leaf node is not selected. For any given input data vector, only one leaf node is selected for the decision tree.

As illustrated in FIG. 4B, the process can be represented by a truth data structure, that shows the results of applying the two masks $M1_i$, $M2_i$ (for each leaf node i) to the result vector bit RV, from the decision nodes. Two of the conditions are impossible by definition, and are noted by "--", because if a node is in the path as a false branch "1" in mask M1, then it must be a taken node (i.e., must be "1" in mask M2). Also, where both mask M1 and mask M2 are "0", those decision nodes are not material to the path to the leaf node, and those conditions will not prevent selection of the leaf node.

As described, each leaf node inference processing is independent of the other leaf nodes, so that the leaf nodes can readily process in parallel the decision node result vector. More particularly, each bit of the result vector that is input to a leaf node, along with the place matching bit in the two masks, are independent of all other bits processed for this leaf node.

Only one leaf node will activate for the decision tree for the given data input vector, and the set of activation bits is a one-hot vector (all "0", except for the activated leaf node, which is "1"). The set of activation bits can be passed into an encoder that converts the result into a numeric index equivalent to the leaf node's position in the tree, as illustrated in FIGS. 2A & 2B.

Figure 5A:
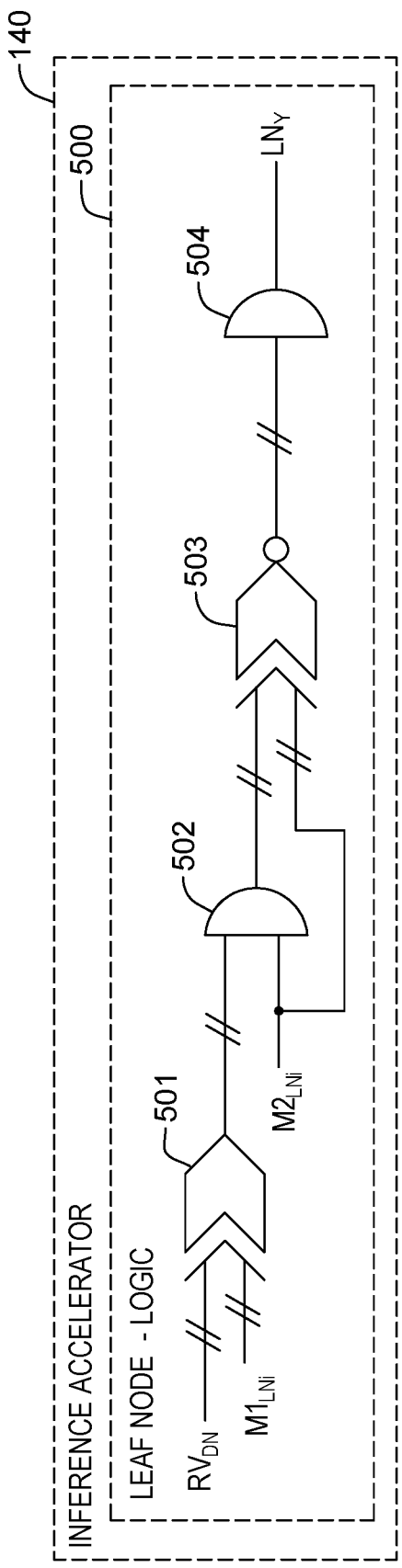
FIGS. 5A & 5B depict different logic embodiments for accelerated inferencing by decision tree leaf nodes, in accordance with one or more aspects of the present invention.

FIG. 5A depicts one embodiment of leaf node logic 500 of an inference accelerator 140 for performing accelerated inference by (or for) a leaf node. In one embodiment, each leaf node process is independent of all other leaf nodes, and the leaf node processing occurs in parallel within the inference accelerator 140. The accelerator includes, in one embodiment, inference processing by each leaf node to determine if it is the one selected. The process includes obtaining the decision node result vector (RVDN) as a register, and applying two masks to determine if the leaf node is the selected leaf node. As noted, only one leaf node for a decision tree is to be selected given the input vector. During processing, one mask ($M1_{LNi}$) is used to identify which decision nodes in the path to the leaf node take a false branch, with the one mask M1 being applied to the decision node result vector with exclusive OR-logic (XOR) 501 (in one embodiment). The other mask ($M2_{LNi}$) is then used to identify the decision nodes in the path to the leaf node. In particular, the other mask M2 for the leaf node is applied to the updated result vector (produced by exclusive OR-logic 501) with AND-logic 502 to produce a further updated result vector, which is compared to the other mask M2 for the leaf node using exclusive NOR-logic 503, after which a reduction AND 504 is applied to the resultant array to indicate whether the leaf node is selected. If the leaf node resultant vector matches the respective mask M2 value, then the leaf node $LN_Y$ is selected.

Figure 5B:
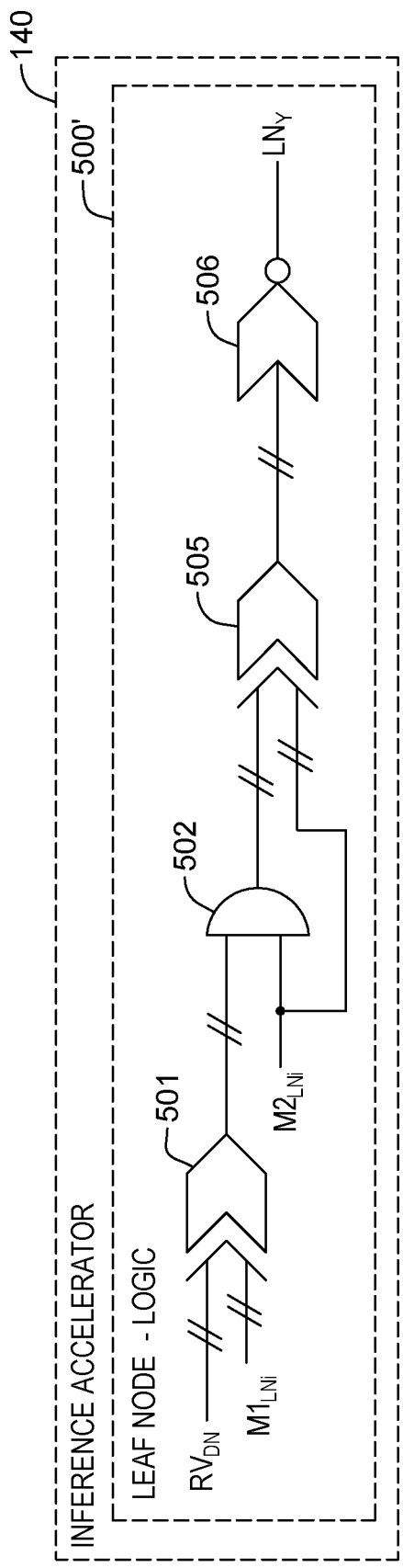

FIG. 5B depicts inference accelerator 140 with an alternate embodiment of leaf node logic 500', in accordance with one or more aspects of the present invention. In this alternate sequence, the respective mask M1 is applied to the decision node result vector with exclusive OR-logic 501, and the other mask M2 is applied to the updated result vector with AND-logic 502, as in the leaf node logic embodiment of FIG. 5A. In the embodiment of FIG. 5B, the further updated result vector is then compared to the mask M2 using exclusive OR-logic 505 to determine whether the leaf node is selected. Reduction-logic is then applied in the example of FIG. 5B using, for instance, NOR-logic 506, to obtain an output $LN_Y$ indicative of whether this leaf node is selected based on the path through the decision nodes.

FIG. 6 depicts examples of a sample result vector of a fully-populated depth-3 decision tree, such as illustrated in FIGS. 3A & 3B, being leaf node inference processed. By way of example only, the decision nodes are assumed to have arbitrarily output a result vector 1010101, with the path vectors and masks M1, M2 for the $4^{th}$ and $7^{th}$ leaf nodes being illustrated. In the embodiment of FIG. 6, the leaf node logic of FIG. 5A is used as illustrated, and as described above. Applying the logic, leaf node L4 is selected in this example, and leaf node L7 is not selected. For the result vector 1010101, the 1-hot result of L1 through L8 is 00010000, where only L4 is selected. This is referred to as the selection vector. The inference accelerator then passes the selection vector into an encoder, which results in in an index of 3, which points to L4 in zero-based encoding. Using the index, the inference accelerator can then locate the leaf node values in the stored leaf node value table(s), as referenced above in connection with FIGS. 2A-2B Further details of one embodiment of facilitating processing within a computing environment, as it relates to one or more aspects of the present invention, are described with reference to FIGS. 7A-7B.

Referring to FIG. 7A, in one embodiment, a decision tree inference accelerator obtains a decision node result vector based on processing of an input data vector through decision nodes of a decision tree 700. The decision tree inference accelerator accelerates leaf node processing of a decision node result vector, and facilitates, based on respective, predetermined path vectors through the decision tree for each leaf node of the plurality of leaf nodes, processing of the decision node result vector by the plurality of leaf nodes in parallel, and determining therefrom which leaf node of the plurality of leaf nodes is selected 702. The decision tree inference accelerator enhances processing within the computing environment by, for instance, parallel processing by the plurality of leaf nodes the decision node result vector based on respective, predetermined path vectors through the decision tree to each leaf node. In this manner, reduced latency of decision tree inference processing is obtained, enhancing processing throughput of the decision tree and/or decision tree ensemble.

In one embodiment, the facilitating by the decision tree inference accelerator includes obtaining for each leaf node one mask and another mask from the respective, predetermined path vector, where each leaf node has a respective one mask and a respective other mask 704, and applying, for a leaf node of the plurality of leaf nodes, the respective one mask and the respective other mask to the decision node result vector to determine whether the leaf node is selected 706.

In one embodiment, the respective one mask identifies which decision nodes in the respective, predetermined path vector took a false branch, and the respective other mask identifies which decision nodes in the respective, predetermined path vector were used, whether true or false, to reach the leaf node 708.

In one example, the applying includes applying the respective one mask to the decision node result vector with exclusive OR-logic to produce an updated result vector 710, and applying the other respective mask to the updated result vector using AND-logic to obtain a further updated result vector 712. The further updated result vector is compared to the respective other mask using exclusive NOR-logic to determine whether the leaf node is selected 714. In one example, reduction-logic is applied to a result of the comparing, with the reduction logic including AND-logic 716.

As illustrated in FIG. 7B, in another example, the applying includes applying the respective one mask to the decision node result vector with exclusive OR-logic to produce an updated result vector 718, and applying the respective other mask to the updated result vector using AND-logic to obtain a further updated result vector 720. The further updated result vector can be compared to the respective other mask using exclusive OR-logic to determine whether the leaf nodes is selected 722, and reduction logic is applied to a result of the comparing, the with the reduction logic including NOR-logic 724.

In one embodiment, the facilitating includes determining, for each leaf node of the plurality of leaf nodes, at least one respective mask from the respective, predetermined path vector, where the respective mask for the plurality of leaf nodes facilitate processing of the decision node result vector by the plurality of leaf nodes in parallel, and determining therefrom which leaf node of the plurality of leaf nodes is selected 726.

In one embodiment, the decision node result vector has a length in bits equal to a number of decision nodes in the decision tree, and the accelerating includes providing each leaf node of the plurality of leaf nodes with the decision node result vector, and the accelerating includes processing, by each leaf node of the plurality of leaf nodes, the decision node result vector in parallel, and determining therefrom which leaf node of the plurality of leaf nodes is selected 728.

In one embodiment, the processing by each leaf node of the decision node result vector is independent of the processing of the decision node result vector by any other leaf node of the plurality of leaf nodes of the decision tree 730.

In one or more implementations, the accelerating by the decision tree inference accelerator includes outputting one or more values associated with a selected leaf node of the plurality of leaf nodes as output results of the decision tree, or an encoded result of the determining which leaf node of the plurality of leaf nodes is selected 732.

Other variations and embodiments are possible.

An inference accelerator of one or more aspects of the present invention may be incorporated and used in many computing environments. One example computing environment is described with reference to FIG. 8. As an example, the computing environment is based on the z/Architecture® hardware architecture, offered by International Business Machines Corporation, Armonk, New York. The z/Architecture hardware architecture, however, is only one example architecture. The computing environment can also be based on other architectures, including, but not limited to, the Intel x86 architectures, other architectures of International Business Machines Corporation, and/or architectures of other companies.

As shown in FIG. 8, a computing environment 800 includes, for instance, a computer system 802 shown, e.g., in the form of a general-purpose computing device. Computer system 802 may include, but is not limited to, one or more processors or processing units 804 (e.g., central processing units (CPUs)), a memory 806 (a.k.a., system memory, main memory, main storage, central storage or storage, as examples), and one or more input/output (I/O) interfaces 808, coupled to one another via one or more buses and/or other connections. For instance, processors 804, as well as one or more inference accelerators 821, and memory 806, are coupled to I/O interfaces 808 via one or more buses 810, and processors 804 and accelerator(s) 821 are coupled to one another via one or more buses 811.

Bus 811 is, for instance, a memory or a cache coherence bus, and bus 810 represents, e.g., one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

As examples, one or more special purpose processors (e.g., adjunct processors) can be separate from but coupled to one or more general purpose processors and/or can be embedded within one or more general purpose processors. May variations are possible.

Memory 806 may include, for instance, a cache 812, such as a shared cache, which may be coupled to local caches 814 of processors 804 and/or to adjunct processor(s) 821, via, for instance, one or more buses 811. Further, memory 806 may include one or more programs or applications 816, at least one operating system 818, one or more computer readable program instructions 820 and one or more interference libraries 822. Computer readable program instructions 820 and inference libraries 822 can be configured to carry out, or facilitate, functions of embodiments of aspects of the invention.

By way of example, in one embodiment, memory 806 (e.g., at least a hardware system area of memory 806) is coupled to one or more inference accelerators 821 via one or more buses 811, and in one or more embodiments.

Computer system 802 can communicate via, e.g., I/O interfaces 808 with one or more external devices 830, such as a user terminal, a tape drive, a pointing device, a display, and one or more data storage devices 834, etc. A data storage device 834 can store one or more programs 836, one or more computer readable program instructions 838, and/or data, etc. The computer readable program instructions can be configured to carry out functions of embodiments of aspects of the invention.

Computer system 802 can also communicate via, e.g., I/O interfaces 808 with network interface 832, which enables computer system 802 to communicate with one or more networks, such as a local area network (LAN), a general wide area network (WAN), and/or a public network (e.g., the Internet), providing communication with other computing devices or systems.

Computer system 802 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 802. Examples, include, but are not limited to: microcode, device drivers, redundant processing units, external disk drive arrays, RAID systems, tape drives, and data archival storage systems, etc.

Computer system 802 can be operational with numerous other general-purpose or special purpose computing system environments or configurations. Examples of well-known computing systems, environments, and/or configurations that may be suitable for use with computer system 802 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 9A:
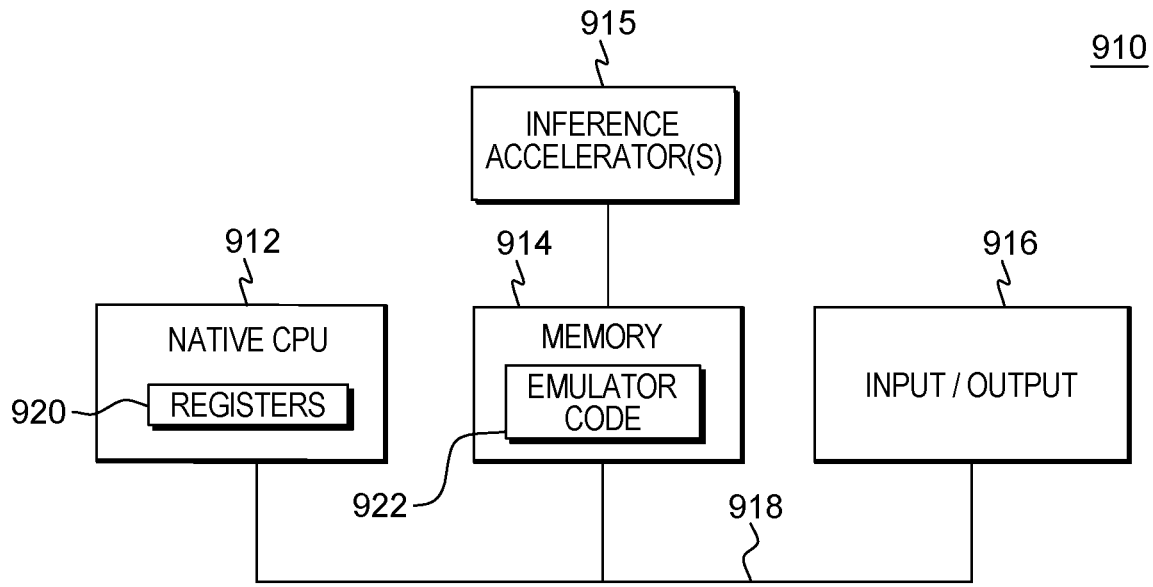
FIG. 9A depicts another example of a computing environment to incorporate and use one or more aspects of the present invention.

Another embodiment of a computing environment to incorporate and use one or more aspects of the present invention is described with reference to FIG. 9A. In this example, a computing environment 900 includes, for instance, a native central processing unit (CPU) 912, a memory 914, and one or more input/output devices and/or interfaces 916 coupled to one another via, for example, one or more buses 918 and/or other connections. As examples, computing environment 910 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 912 includes one or more native registers 920, such as one or more general purpose registers and/or one or more special purpose registers used during processing within the environment. These registers include information that represents the state of the environment at any particular point in time.

Moreover, native central processing unit 912 executes instructions and code that are stored in memory 914. In one particular example, the central processing unit executes emulator code 922 stored in memory 914. This code enables the computing environment configured in one architecture to emulate another architecture. For instance, emulator code 922 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 9B:
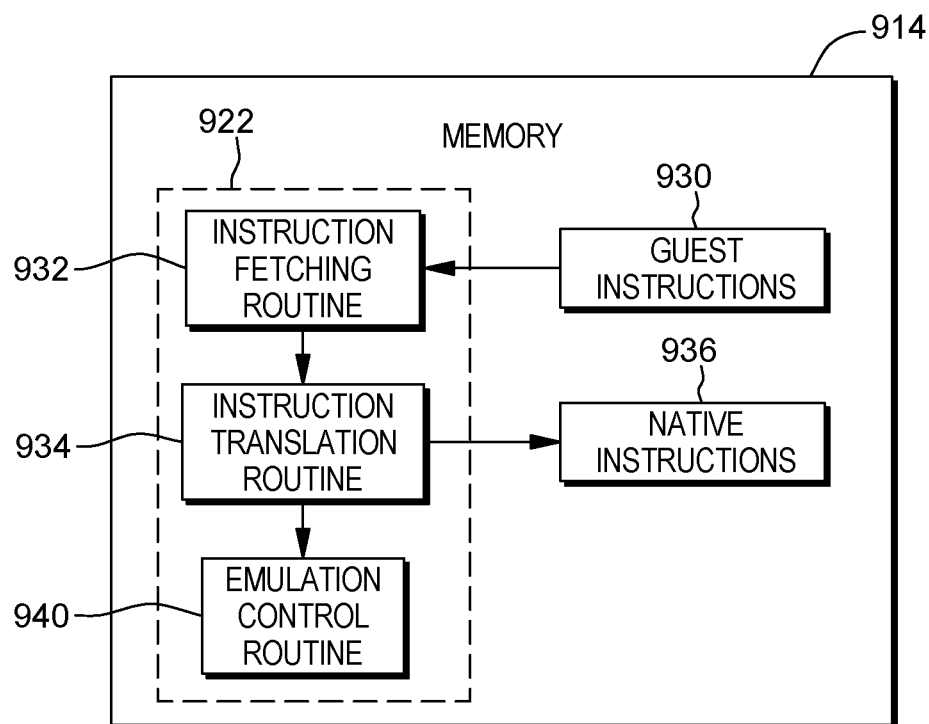

Further details relating to emulator code 922 are described with reference to FIG. 9B. Guest instructions 930 stored in memory 914 comprise software instructions (e.g., correlating to machine instructions) that were developed to be executed in an architecture other than that of native CPU 912. For example, guest instructions 930 may have been designed to execute on a processor based on the z/Architecture hardware architecture, but instead, are being emulated on native CPU 912, which may be, for example, an Intel Itanium II processor. In one example, emulator code 922 includes an instruction fetching routine 932 to obtain one or more guest instructions 930 from memory 914, and to optionally provide local buffering for the instructions obtained. It also includes an instruction translation routine 934 to determine the type of guest instruction that has been obtained and to translate the guest instruction into one or more corresponding native instructions 936. This translation includes, for instance, identifying the function to be performed by the guest instruction and choosing the native instruction(s) to perform that function.

Further, emulator code 922 includes an emulation control routine 940 to cause the native instructions to be executed. Emulation control routine 940 may cause native CPU 912 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 936 may include loading data into a register from memory 914; storing data back to memory from a register; or performing some type of arithmetic or logic operation, as determined by the translation routine.

Each routine is, for instance, implemented in software, which is stored in memory and executed by native central processing unit 912. In other examples, one or more of the routines or operations are implemented in firmware, hardware, software or some combination thereof. The registers of the emulated processor may be emulated using registers 920 of the native CPU or by using locations in memory 914. In embodiments, guest instructions 930, native instructions 936 and emulator code 922 may reside in the same memory or may be disbursed among different memory devices.

Further, in one embodiment, computing environment 910 includes one or more inference accelerators 915 coupled to memory 914. The one or more accelerators are defined in one architecture and are configured to emulate another architecture. For example, an accelerator obtains guest commands of the architecture being emulated, translates the guest commands into native commands of the one architecture and executes the native commands.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured for an inference acceleration facility, in accordance with one or more aspects of the present invention.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
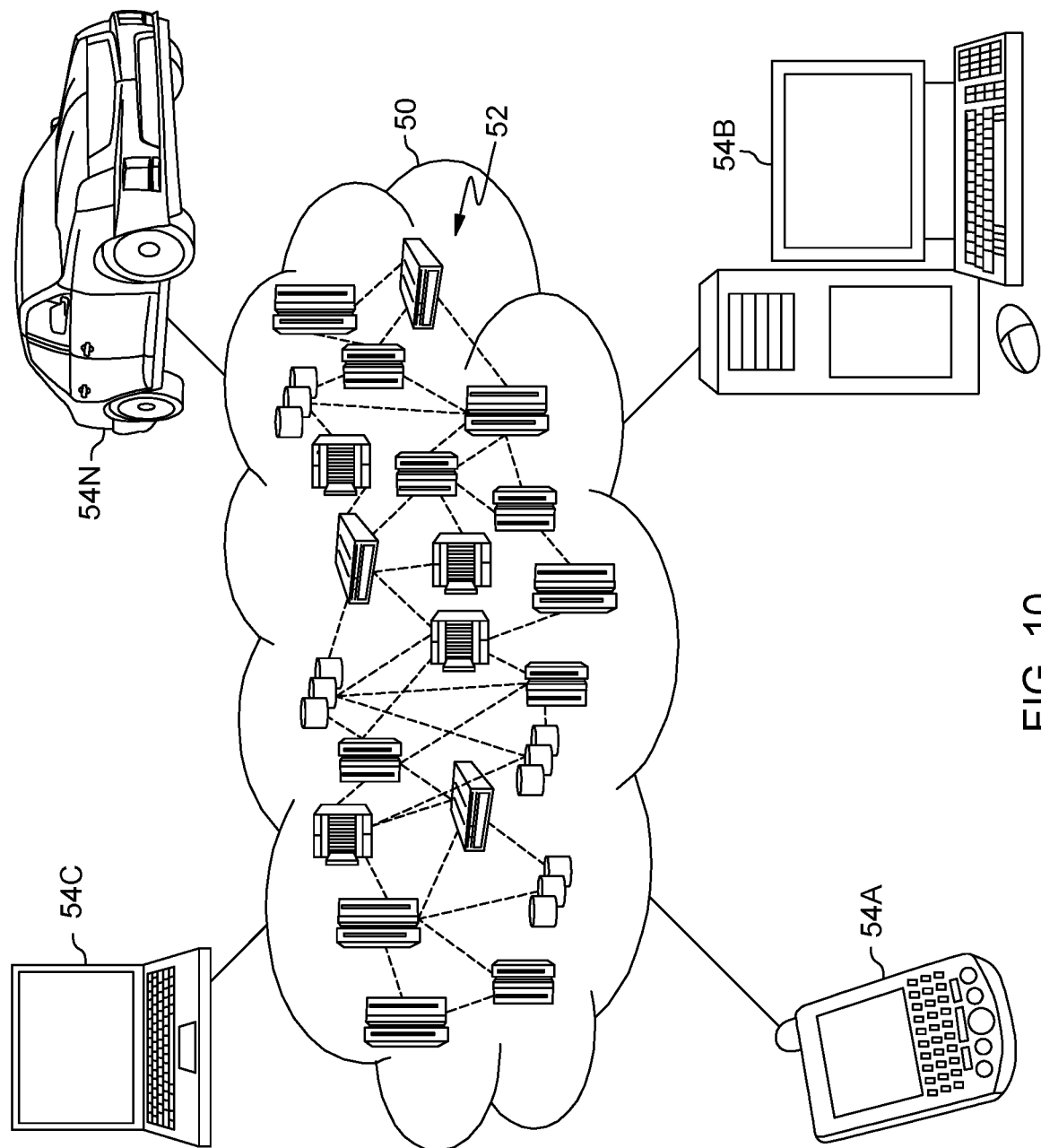
FIG. 10 depicts another example of a cloud computing environment, in accordance with one or more aspects of the present invention.

Referring now to FIG. 10, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 52 and cloud computing environment 50 can communicate with any type of computerized device over any type of network and/or network addressable connection (e.g., using a web browser).

Figure 11:
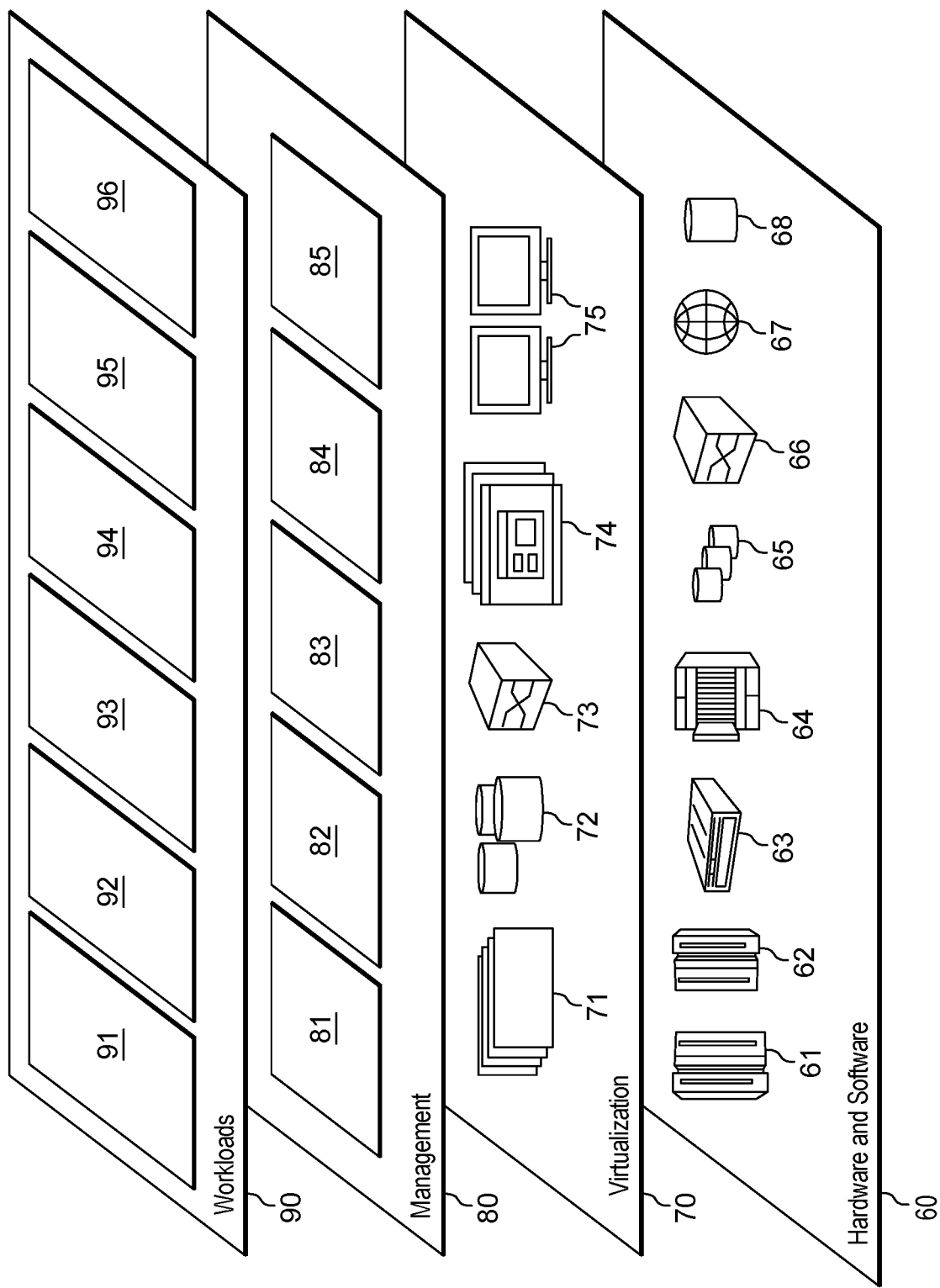
FIG. 11 depicts one example of abstraction model layers, in accordance with one or more aspects of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and inference accelerator processing 96.

Aspects of the present invention can be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, commands or operations may be used. Additionally, different types of indications or tags may be specified. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A system for facilitating processing within a computing environment, the system comprising:
   a memory; and
   a processing circuit in communication with the memory, wherein the system is configured to perform a method, the method comprising:
      providing a decision tree inference accelerator to perform inference processing, the decision tree inference accelerator being configured to perform operations comprising:
         generating obtaining, by the decision tree inference accelerator, a decision node result vector based on processing of an input data vector through decision nodes of a decision tree; and
         parallel processing, by the decision tree inference accelerator, the decision node result vector, based on respective, predetermined path vector through the decision tree for each leaf node of a plurality of leaf nodes, the parallel processing of the decision node result vector using respective masks for each leaf node determined from the respective, predetermined path vector through the decision tree for that leaf node, wherein using the respective masks only one leaf node is selected for the decision tree for any given input data vector during the inference processing, thereby allowing the decision node result vector to be processed by the decision tree inference accelerator in parallel through the plurality of leaf nodes and determining therefrom which leaf node of the plurality of leaf nodes is selected.

2. The system of claim 1, wherein the operations further comprise
   obtaining for each leaf node one mask and another mask from the respective, predetermined path vector, wherein each leaf node has a respective one mask and a respective other mask; and
   wherein the parallel processing comprises applying, for a leaf node of the plurality of leaf nodes, the respective one mask and the respective other mask to the decision node result vector to determine whether the leaf node is selected.

3. The system of claim 2, wherein the respective one mask identifies which decision nodes in the respective, predetermined path vector took a false branch, and the respective other mask identifies which decision nodes in the respective, predetermined path vector were used, whether true or false, to reach the leaf node.

4. The system of claim 3, wherein the applying includes:
   applying the respective one mask to the decision node result vector with exclusive OR-logic to produce an updated result vector;
   applying the other respective mask to the updated result vector using AND-logic to obtain a further updated result vector;
   comparing the respective other mask to the further updated result vector using exclusive NOR-logic to determine whether the leaf node is selected; and
   applying reduction-logic to a result of the comparing, the reduction-logic comprising AND-logic.

5. The system of claim 3, wherein the applying includes:
   applying the respective one mask to the decision node result vector with exclusive OR-logic to produce an updated result vector;
   applying the respective other mask to the updated result vector using AND-logic to obtain a further updated result vector;

comparing the respective other mask to the further updated result vector using exclusive OR-logic to determine whether the leaf node is selected; and applying reduction-logic to a result of the comparing, the reduction-logic comprising NOR-logic.

6. The system of claim 1, wherein the operations further comprise determining, for each leaf node of the plurality of leaf nodes, respective masks from the respective, predetermined path vector, the respective masks for the plurality of leaf nodes facilitating processing of the decision node result vector by the plurality of leaf nodes in parallel, and determining therefrom which leaf node of the plurality of leaf nodes is selected.

7. The system of claim 1, wherein the decision node result vector has a length in bits equal to a number of decision nodes in the decision tree.

8. The system of claim 1, wherein the parallel processing by each leaf node of the decision node result vector is independent of the processing of the decision node result vector by any other leaf node of the plurality of leaf nodes of the decision tree.

9. The system of claim 1, wherein the operations further comprise outputting one or more values associated with a selected leaf node of the plurality of leaf nodes as output results of the decision tree, or an encoded result of the determining which leaf node of the plurality of leaf nodes is selected.

10. A computer-implemented method of facilitating processing within a computing environment, the computer-implemented comprising:
providing a decision tree inference accelerator to perform inference processing, the decision tree inference accelerator being configured to perform operations comprising:
generating, by the decision tree inference accelerator, a decision node result vector based on processing of an input data vector through decision nodes of a decision tree; and
parallel processing, by the decision tree inference accelerator, the decision node result vector, based on respective, predetermined path vector through the decision tree for each leaf node of a plurality of leaf nodes, the parallel processing of the decision node result vector using respective masks for each leaf node determined from the respective, predetermined path vector through the decision tree for that leaf node, wherein using the respective masks only one leaf node is selected for the decision tree for any given input data vector during the inference processing, thereby allowing the decision node result vector to be processed by the decision tree inference accelerator in parallel through the plurality of leaf nodes and determining therefrom which leaf node of the plurality of leaf nodes is selected.

11. The computer-implemented method of claim 10, wherein the operations further comprise:
obtaining for each leaf node one mask and another mask from the respective, predetermined path vector, wherein each leaf node has a respective one mask and a respective other mask; and
wherein the parallel processing comprises applying, for a leaf node of the plurality of leaf nodes, the respective one mask and the respective other mask to the decision node result vector to determine whether the leaf node is selected.

12. The computer-implemented method of claim 11, wherein the respective one mask identifies which decision nodes in the respective, predetermined path vector took a false branch, and the respective other mask identifies which decision nodes in the respective, predetermined path vector were used, whether true or false, to reach the leaf node.

13. The computer-implemented method of claim 12, wherein the applying includes:
applying the respective one mask to the decision node result vector with exclusive OR-logic to produce an updated vector;
applying the other respective mask to the updated result vector using AND-logic to obtain a further updated result vector;
comparing the respective other mask to the further updated result vector using exclusive NOR-logic to determine whether the leaf node is selected; and
applying reduction-logic to a result of the comparing, the reduction-logic comprising AND-logic.

14. The computer-implemented method of claim 12, wherein the applying includes:
applying the respective one mask to the decision node result vector with exclusive OR-logic to produce an updated result vector;
applying the respective other mask to the updated result vector using AND-logic to obtain a further updated result vector;
comparing the respective other mask to the further updated result vector using exclusive OR-logic to determine whether the leaf node is selected; and
applying reduction-logic to a result of the comparing, the reduction-logic comprising NOR-logic.

15. The computer-implemented method of claim 10, wherein the operations further comprise determining, for each leaf node of the plurality of leaf nodes, at least one respective masks from the respective, predetermined path vector, the respective masks for the plurality of leaf nodes facilitating processing of the decision node result vector by the plurality of leaf nodes in parallel, and determining therefrom which leaf node of the plurality of leaf nodes is selected.

16. The computer-implemented method of claim 10, wherein the decision node result vector has a length in bits equal to a number of decision nodes in the decision tree.

17. A computer program product for facilitating processing within a computing environment, the computer program product comprising:
at least one computer-readable storage medium having program instructions embodied therewith, the program instructions being readable by a processing circuit to cause the processing circuit to perform a method comprising:
providing a decision tree inference accelerator to perform inference processing, the decision tree inference accelerator being configured to perform operations comprising:
generating, by the decision tree inference accelerator, a decision node result vector based on processing of an input data vector through decision nodes of a decision tree; and
parallel processing, by the decision tree inference accelerator, the decision node result vector, based on respective, predetermined path vector through the decision tree for each leaf node of a plurality of leaf nodes, the parallel processing of the decision node result vector using respective masks for each leaf node determined from the respective, predetermined path vector through the decision tree for that leaf node, wherein using the respective masks only one leaf node is selected for the decision tree for any given input data vector during the inference processing, thereby allowing the decision node result vector to be processed by the decision tree inference accelerator in parallel through the plurality of leaf nodes and determining therefrom which leaf node of the plurality of leaf nodes is selected.

18. The computer program product of claim 17, wherein the operations further comprise:

obtaining for each leaf node one mask and another mask from the respective, predetermined path vector, wherein each leaf node has a respective one mask and a respective other mask; and wherein the parallel processing comprises applying, for a leaf node of the plurality of leaf nodes, the respective one mask and the respective other mask to the decision node result vector to determine whether the leaf node is selected.

19. The computer program product of claim 18, wherein the respective one mask identifies which decision nodes in the respective, predetermined path vector took a false branch, and the respective other mask identifies which decision nodes in the respective, predetermined path vector were used, whether true or false, to reach the leaf node.

20. The computer program product of claim 17, wherein the operations further comprise determining, for each leaf node of the plurality of leaf nodes, respective masks from the respective, predetermined path vector, the respective masks for the plurality of leaf nodes facilitating processing of the decision node result vector by the plurality of leaf nodes in parallel, and determining therefrom which leaf node of the plurality of leaf nodes is selected.

* * * * *